United States Patent
Chaumel et al.

(10) Patent No.: US 10,569,855 B2
(45) Date of Patent: Feb. 25, 2020

(54) WINDSHIELD WITH SUPPORT ROD

(71) Applicant: Airbus Operations SAS, Toulouse (FR)

(72) Inventors: Pascal Chaumel, Plaisance du Touch (FR); Patrick Lieven, Fronton (FR); Samuel Burgunder, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 377 days.

(21) Appl. No.: 15/377,213

(22) Filed: Dec. 13, 2016

(65) Prior Publication Data
US 2017/0166293 A1 Jun. 15, 2017

(30) Foreign Application Priority Data
Dec. 15, 2015 (FR) .................................... 15 62377

(51) Int. Cl.
*B64C 1/14* (2006.01)

(52) U.S. Cl.
CPC .......... *B64C 1/1492* (2013.01); *B64C 1/1476* (2013.01)

(58) Field of Classification Search
CPC ... B64C 1/1476; B64C 1/1484; B64C 1/1492; B63B 19/02
USPC ............. 244/129.3; 296/84.1, 96.21; 52/208, 52/204.71, 204.72, 204.57, 204.597, 52/204.62
See application file for complete search history.

(56) References Cited

U.S. PATENT DOCUMENTS

| | | | |
|---|---|---|---|
| 2,328,263 A | 8/1943 | De Stefano | |
| 2,409,808 A * | 10/1946 | Sowle | B64C 1/1492 52/204.595 |
| 3,429,530 A * | 2/1969 | Hertel | B64C 1/1484 244/129.3 |
| 3,829,153 A * | 8/1974 | Fussell, Jr. | B60J 1/20 114/361 |
| 4,324,373 A * | 4/1982 | Zibritosky | B64C 1/1492 244/117 R |
| 4,579,301 A | 4/1986 | Brand | |
| 7,802,413 B2 * | 9/2010 | Wood | B64C 1/1492 244/129.3 |
| 7,942,369 B2 * | 5/2011 | Mahieu | B64C 1/1476 244/129.3 |
| 2008/0149769 A1 | 6/2008 | Koch et al. | |

(Continued)

FOREIGN PATENT DOCUMENTS

| | | |
|---|---|---|
| DE | 102009023856 | 12/2010 |
| EP | 2107001 | 10/2009 |

(Continued)

OTHER PUBLICATIONS

French Search Report, dated Oct. 5, 2016, priority document.

*Primary Examiner* — Richard R. Green
(74) *Attorney, Agent, or Firm* — Greer, Burns & Crain, Ltd.

(57) ABSTRACT

An aircraft windshield that improves pilot and co-pilot's perception of the outside world. The windshield includes a transparent panel held inside a structure of the aircraft, in which the upper part and the lower part are bridged so that the loads applied to the panel are (at least partially) diverted. Due to part of the loads applied on the panel being diverted, it is possible to provide a larger window panel than currently available that offers better visibility to the outside.

12 Claims, 7 Drawing Sheets

(56) References Cited

U.S. PATENT DOCUMENTS

| | | | |
|---|---|---|---|
| 2010/0308168 A1 | 12/2010 | Joern | |
| 2013/0221156 A1* | 8/2013 | Guering | B64C 1/061 244/119 |
| 2013/0320143 A1* | 12/2013 | Chaumel | B64C 1/1484 244/129.3 |
| 2014/0166809 A1* | 6/2014 | Dazet | B64C 1/1492 244/121 |
| 2015/0232169 A1* | 8/2015 | Markmiller | B64C 1/1492 244/129.3 |

FOREIGN PATENT DOCUMENTS

| | | |
|---|---|---|
| FR | 1025950 | 4/1953 |
| FR | 2998865 | 6/2014 |
| GB | 568413 | 4/1945 |

* cited by examiner

WINDSHIELD WITH SUPPORT ROD

CROSS-REFERENCES TO RELATED APPLICATIONS

This application claims the benefit of the French patent application No. 1562377 filed on Dec. 15, 2015, the entire disclosures of which are incorporated herein by way of reference.

BACKGROUND OF THE INVENTION

The present invention concerns an aircraft windshield. It applies to every type of aircraft and especially to commercial airplanes.

Generally speaking, commercial airplanes are outfitted with a windshield having several panes of glass. The windshield of a cockpit has many functions. It allows the pilots to have a visibility of the outside surroundings and thus be able to control the aircraft in flight, as well as on the ground. It maintains a given pressure inside the cockpit during flight, namely, at altitudes where the outer pressure is greatly different from that which is needed inside the aircraft for the persons on board. It protects the pilot and co-pilot against impacts from birds, stones, or other various types of objects. It may thus be subject to substantial degradation requiring a replacement: thus, it is preferable that the glass panes be secured to the structure of the cockpit in a way such that they are easily replaceable.

The windshield should thus meet various criteria of transparency, resistance to structural loads, to pressure, rigidity and solidity to withstand impacts and degradation while allowing for interchangeability, and this for the service life of the airplane.

Figure 1:
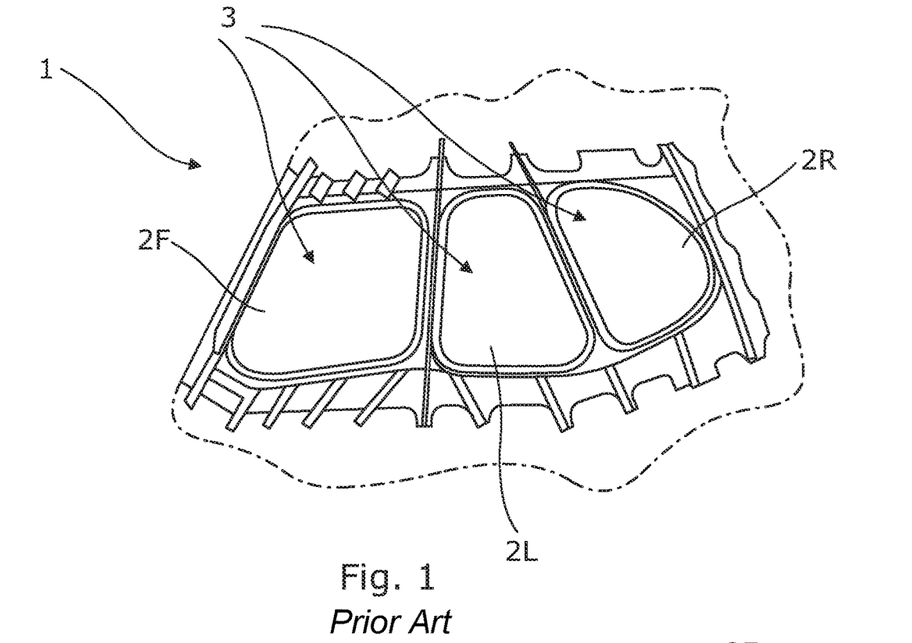
FIG. 1 is a partial perspective view of a windshield according to the prior art.

There is described in patent application FR 2998865 a windshield 1 as represented in FIG. 1 comprising six glasses (only half of them being represented in FIG. 1), two 2F at the front level, namely, facing respectively the pilot and the co-pilot, two 2L in the side region and two 2R in the rear area, again with respect to the pilots and co-pilots.

Figure 2:
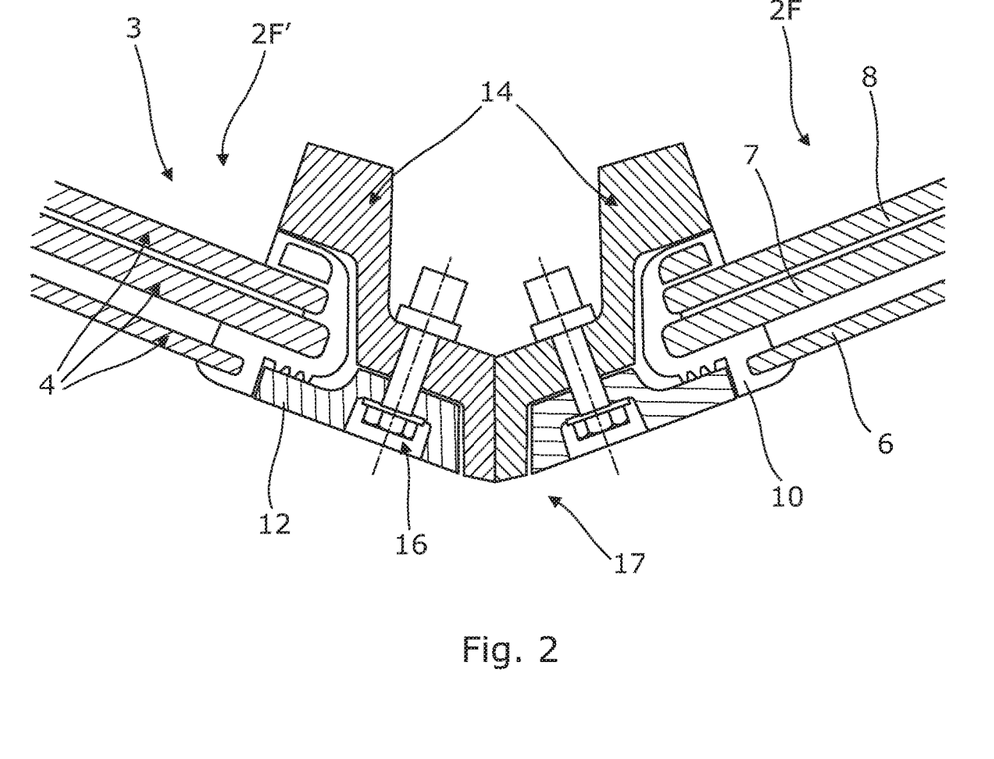
FIG. 2 shows a schematic and partial simplified view in cross section along a horizontal plane of the bond between the two front glasses of a windshield of known type.

As illustrated in the embodiment represented in FIG. 2 (and as also shown by FIGS. 2 to 5 of the cited patent), quite often, in schematic and simplified manner, a glass 2 of a windshield 1 of an aircraft cockpit is composed of three superimposed plies 4 of transparent material. The outer ply 6 in contact with the outside atmosphere presents characteristics which allow it to resist abrasion and especially the movement of the windshield wipers, but does not ensure the mechanical strength of the windshield. That strength is provided by the other two plies 7, 8.

The extremity of the three plies 4 is encircled by a one-piece gasket 10.

The gasket 10 and one or more of the extremities of the three plies 4 are enclosed between a one-piece flange 12 and the structure 14 of the cockpit of the aircraft and more particularly a frame provided for this purpose. The flange 12 is secured to the frame with the aid of an assembly system of the nut/screw 16 or equivalent type.

FIG. 2 shows the bonding between the two front glasses 2F and 2F' (not represented in FIG. 1) of the windshield. The framing of the glass 2F is adjacent to the framing of the glass 2F' so as to form an angle allowing the two respective glasses no longer to be located in the same plane, but instead be oriented to face the pilot and the co-pilot, respectively. The framing of the glasses 2F in opaque material forms a nontransparent band 17 between the two glasses 2F and 2F'.

As a result, the bond between the two front glasses disturbs the visual access of the pilot and co-pilot to the outer surroundings.

In fact, all the bonds between the glasses 2, namely, between the rear glass 2R and the side glass 2L, between the side glass 2L and the front glass 2F and between the front glasses 2F, 2F' not only diminish the visibility of the pilots and co-pilots in the outer space, but also provides an impediment to their piloting which increases with the size of the space separating the glasses.

SUMMARY OF THE INVENTION

Thus, the purpose of the present invention is to mitigate this drawback and to propose a windshield which is able to improve the perception of the outer world by the pilot and co-pilot.

The aircraft windshield includes a transparent panel held inside a structure of the aircraft, in which the upper part and the lower part are bridged by an elongated structural element so that the loads applied to said panel from the upper and lower part are at least partially diverted.

Due to part of the loads applied on the panel being diverted, it is possible to design a larger window panel that offers better visibility to the outside.

The windshield has at least one of the following optional characteristics, taken alone or in combination.

The structural element is independent of the panel, at a distance from the panel, and positioned transversely between the lateral parts of the structure framing the panel, at a distance from them.

The panel is continuous with regard to the structural element.

The panel has a curvature at least in one transverse direction.

The bridge comprises an elongated structural element, one of whose ends is attached to the upper part of the aircraft structure and the other end is attached to the lower part.

The structure of the aircraft framing the panel is of greater thickness than the thickness of the panel so as to form a recess.

The structural element is a rod hinged about a pivot at each of its ends to the aircraft structure framing the panel.

The bridged panel is the front panel and the bridge is realized by a central rod positioned in a vertical plane P of symmetry of the aircraft.

The bridge is present in the form of a structural element of quadrangular cross section.

The bridge is present in the form of a structural element having two coaxial parts fitted one into the other.

The windshield comprises a plurality of bridged panels.

A panel of the windshield comprises a plurality of bridges.

According to one particular form, the windshield comprises a single panel provided with a plurality of bridges.

The present invention also concerns the aircraft provided with a windshield having the above characteristics.

BRIEF DESCRIPTION OF THE DRAWINGS

Other purposes, advantages and characteristics of the invention will appear upon perusal of the following description of the windshield according to the invention, given as a nonlimiting example with reference to the enclosed drawings, in which.

DETAILED DESCRIPTION OF THE PREFERRED EMBODIMENTS

Figure 3A:
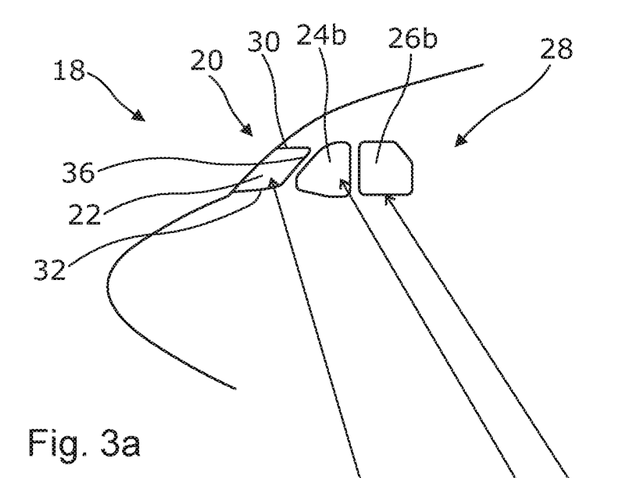
FIG. 3a shows a schematic partial simplified view in plan view of a front tip of an aircraft according to the present invention from the side.
Figure 3B:
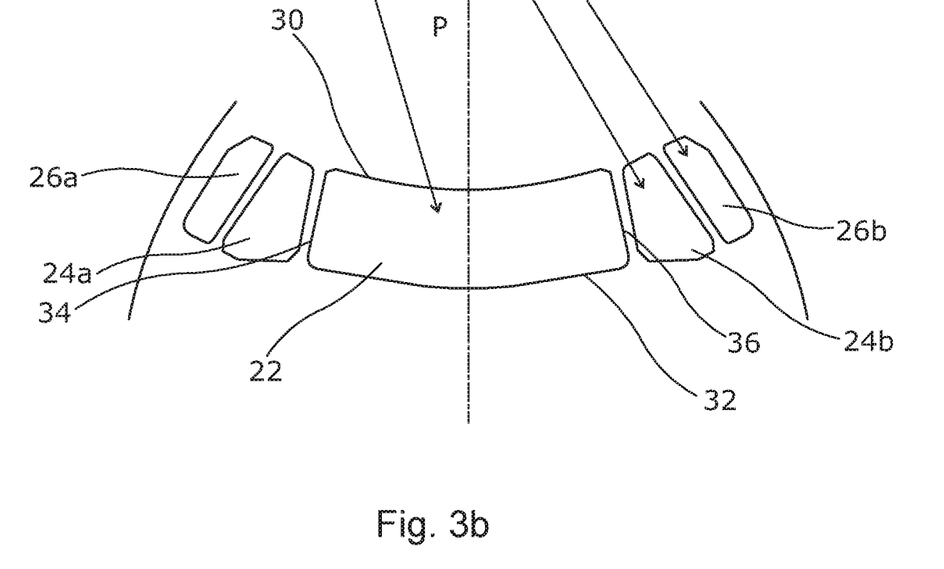
FIG. 3b shows a schematic partial simplified view in plan view of an enlarged front view of the windshield of said front tip.

As shown in FIGS. 3a and 3b, an aircraft 18 has a windshield 20 comprising a single transparent front panel 22 facing the pilot and co-pilot, two side panels 24a, 24b and two rear panels 26a, 26b. The transparent panels used in the windshields are for the most part still comprised today of laminated glass: these are known as glass panels or glasses, due to the fact that they contain glass. However, in certain touring airplanes one can now find panels of polymethylmethacrylate more commonly known as Plexiglas. One may also find writings about windshields of acrylic or polycarbonate. For this reason, in the rest of the description the term panel will be used to designate more generally the glasses of a windshield taking into account modern developments of the materials used.

The presence of the side panels 24a, 24b and/or rear panels 26a, 26b depends on the size of the aircraft and more particularly its cockpit 28.

The panels 22, 24 and 26 are curved at least in one direction transversally to said panel (direction perpendicular to its longitudinal direction). In the embodiment illustrated, the panels have a double curvature, transversal and longitudinal. The curved shape of the panel 22 allows it to adapt perfectly to the double curvature of the front tip, thus reducing the aerodynamic drag of the aircraft 18.

In all of the figures, it is assumed that the airplane is resting on a horizontal ground, from which a vertical direction is a direction perpendicular to the ground and likewise perpendicular to the longitudinal direction of the aircraft. The vertical direction and the longitudinal direction form a vertical plane parallel to a plane of symmetry of the aircraft.

The front panel 22 comprises an upper edge 30, a lower edge 32 and two lateral edges 34, 36. The aircraft 18 has a central vertical overall plane of symmetry P (represented in FIG. 3b). The plane of symmetry P divides the cockpit 28 into two parts: in one of them is situated the pilot and in the other the co-pilot. The front panel 22 is symmetrical with respect to the plane P. The lateral panels 24a, 24b and the rear panels 26a, 26b are symmetrical with respect to the plane P.

Figure 4:
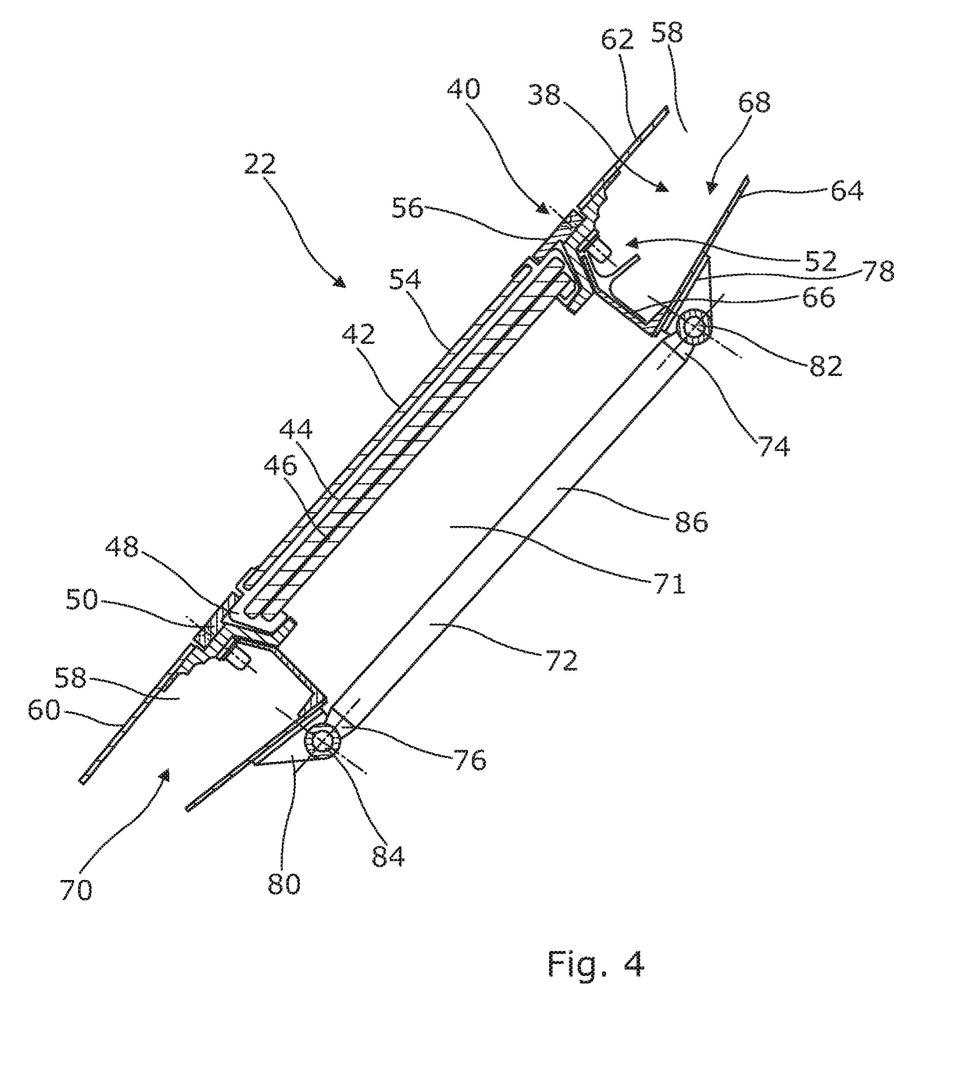
FIG. 4 is a partial sectional view of the windshield along a central vertical plane of symmetry of the support rod of the windshield.

As shown by FIG. 4, the front panel 22 is mounted on a structure 38 of the aircraft by means of a fixation system 40, explained further below.

The front panel 22 comprises three plies, an outer ply 42, a middle ply 44 and an internal ply 46. The ends of the plies are surrounded by a sealing gasket 48. The peripheral edge 30, 32, 34, 36 of the panel 22 and more precisely in the embodiment illustrated, the sealing gasket 48, is sandwiched between the structure 38 of the airplane and a fixation flange 50. The structure of the aircraft 38 and the fixation flange 50 respectively form directly or indirectly a clamp in which the panel 22 is held by its peripheral edges 30, 32, 34, 36. The structure 38 of the airplane and the fixation flange 50 are clamped with the aid of a nut and screw type assembly system 52.

In the embodiment illustrated, the outer ply 42 has a smaller dimension in the two directions, longitudinal and lateral, of the panel than the other two plies 44, 46. The dimension of the outer ply 42 is such that the ply surrounded by the gasket 48 interlocks in the opening provided by the fixation flange 50. The outer surface 54 of the outer ply 42 is nearly, except for the height of the gasket, continuous with the outer surface 56 of the fixation flange 50. The middle 44 and inner 46 plies extend beyond the outer ply 42 toward the structure 38 of the aircraft: the ends of the middle 44 and inner 46 plies are squeezed between the flange 50 and the structure 38 of the aircraft. The outer ply 42 held against the other two plies by the gasket 48 is inserted and adjoins the free end of the flange 50.

The structure 38 of the airplane is present in the form of a hollow box 58 of more or less complex shape. The box 58 comprises an outer 60 whose outer surface 62 is continuous with the outer surface 56 of the flange 54 and the outer surface 54 of the outer ply 42. The box 58 likewise comprises a lower face 64 joined directly or indirectly by lateral faces 66 to the outer face 60. The box 58 surrounds the panel 22 and thus comprises four parts, an upper part, a lower part, and two lateral parts. Only the upper 68 and lower 70 parts of the box are represented in FIG. 4. The structure of the aircraft in the region where the panel is secured and in the embodiment shown the box has a greater thickness than that of the panel 22 so as to form a recess 71.

The front panel 22 must withstand the pressure loads of the cockpit. Now, the dimensions of the front panel 22 are increased as compared to the front glasses of known type. The windshield 20 comprises a bridge between the upper part and the lower part of the structure 38 of the aircraft framing the panel 22, or the box 58 here, able to absorb a portion of the loads applied to the panel 22. The bridge means here the putting in place of a structural element able to divert at least in part the pressure loads which are applied from the upper part 68 of the box above the panel 22 onto the panel 22 and onto the lower part 70 of the box below the panel 22. The structural element takes up at least some of the forces applied to the panel. The term bridge is likewise used because the rod links the upper and lower parts of the box on the inside or the recess side 70, thus forming a bridge between them, a load absorbing bond.

The structural element is distinct and independent from the panel 22: it is not connected in any way to the panel. The structural element is connected to the panel holding structure but not at all to the panel proper. It is not part of the panel holding structure.

The structural element is located at a distance from the panel 22, facing the latter, between the lateral parts of the structure framing the panel 22 and at a distance from them. The structural element is not situated opposite the structure framing the panel. In the embodiment illustrated, as will be seen further below, in the case of a single structural element this may be located at equal distance from the lateral parts. The transparent panel presents a continuity in regard to the structural element. The structural element takes up a portion of the forces being exerted on the panel.

The structural element is of elongated shape, namely, extending in length or also extending more longitudinally than transversally.

Thus, thanks to the bridge, with the same height and the same thickness of panel as those of the front windshield glasses of known type, the deformation of the panel 22 under the pressure loads of the cockpit remains on the same level.

The structural element can have any desired form, for example, the form of a rod, beam, brace, support bar or stem.

In the embodiment illustrated in FIG. 4, the structural element is present in the form of a rod 72 secured at one of its ends 74 to the upper part 68 of the box and at the other end 76 to the lower part 70 of the box. The ends 74, 76 of the rod are secured by means of a plate 78, 80 respectively to the upper part 68 and to the lower part 70 of the box. Each of the ends 74, 76 is hinged respectively to the plate 78, 80 so as to allow a pivoting link between the rod and the structure of the aircraft or a movement in rotation about an axis 82, 84 perpendicular to the axis of the rod 72 and parallel respectively to the associated upper 68 and lower 70 parts of the box. The enabled movement in rotation allows the rod to follow the possible movements of one part of the box in relation to another, while preventing any twisting, buckling, or other possible deformation of the rod. The hinging is done with the aid of any means of known type. In the case of the rod, the rod end in the shape of a bushing rotates about the axis 82, 84 provided in the area of the associated plate 78, 80.

Figure 5:
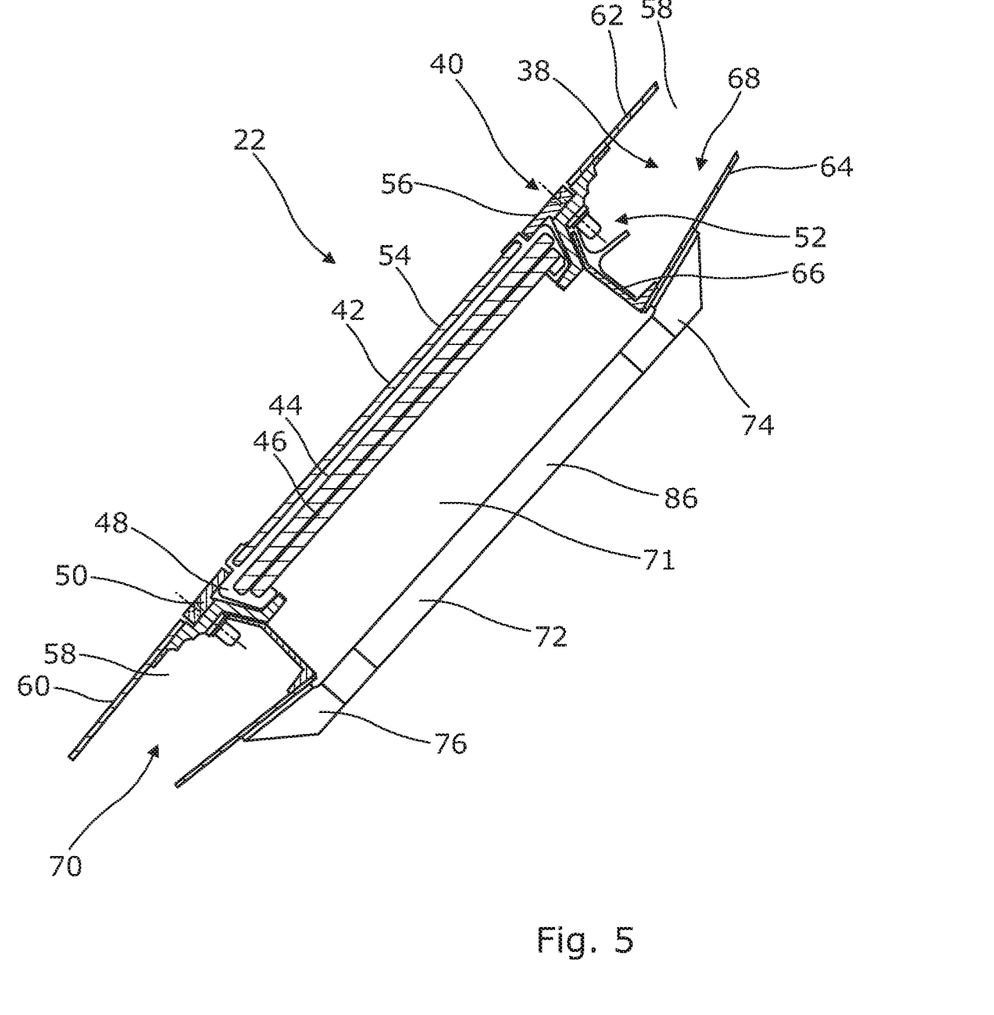
FIG. 5 is a partial sectional view of another embodiment of the windshield along a central vertical plane of symmetry of the support rod of the windshield.

FIG. 5 shows another possible embodiment of the rod 72 in which the rod is no longer hinged but rather secured without hinging at each of its ends by one of its ends 74 to the upper part 68 of the box and at the other end 76 to the lower part 70 of the box. The rod is secured by any known means, for example, by rigid fitting. Only one of its ends need not be hinged, the other one being hinged as described previously.

Figure 6A:
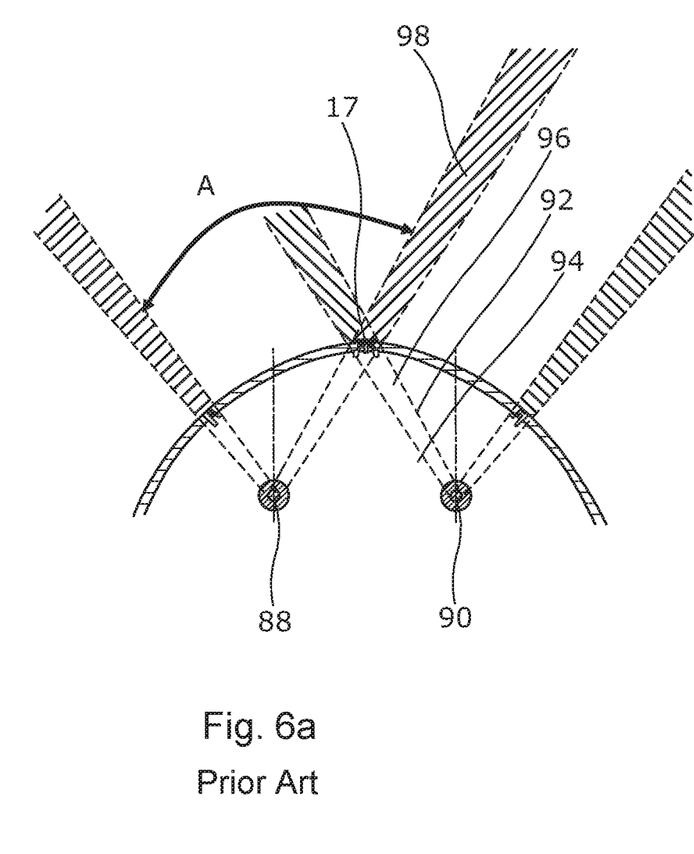
FIG. 6a shows a partial schematic view of the cockpit in section along a horizontal plane located in the area facing the pilot and co-pilot according to the prior art.
Figure 6B:
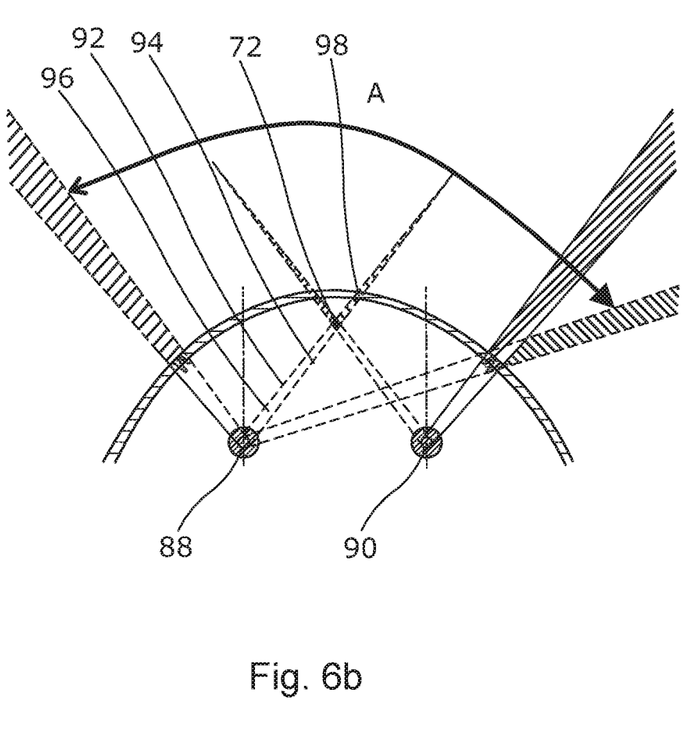
FIG. 6b shows a partial schematic view of the cockpit in section along a horizontal plane located in the area facing the pilot and co-pilot according to the present invention.

FIG. 6b shows the effect of the rod 72 on the field of vision of the pilot and co-pilot as compared to FIG. 66a showing the effect of the rigid fitting 17 between two front glasses. The pilot's head is represented by a circle 88 and that of the co-pilot by a circle 90 in both figures. The field of vision of each of them when their gaze is turned toward the rigid fitting or toward the rod is represented by the space 96 between two dotted lines 92, 94. The hatched space between the two dotted lines 92, 94 represents the space of the field of vision of the pilot or co-pilot, respectively, which is blocked by the rigid fitting 17 and the rod 72.

The rod 72 being of much smaller size than that of the rigid fitting 17, it does not impede the central field of vision of the pilot and co-pilot, as shown by FIG. 6b. Hence, the amplitude A of the front field of vision of the pilot and co-pilot represented by the double arrow in FIG. 6b is much more sizeable, nearly double that of windshields of known type in the form illustrated.

Figure 7:
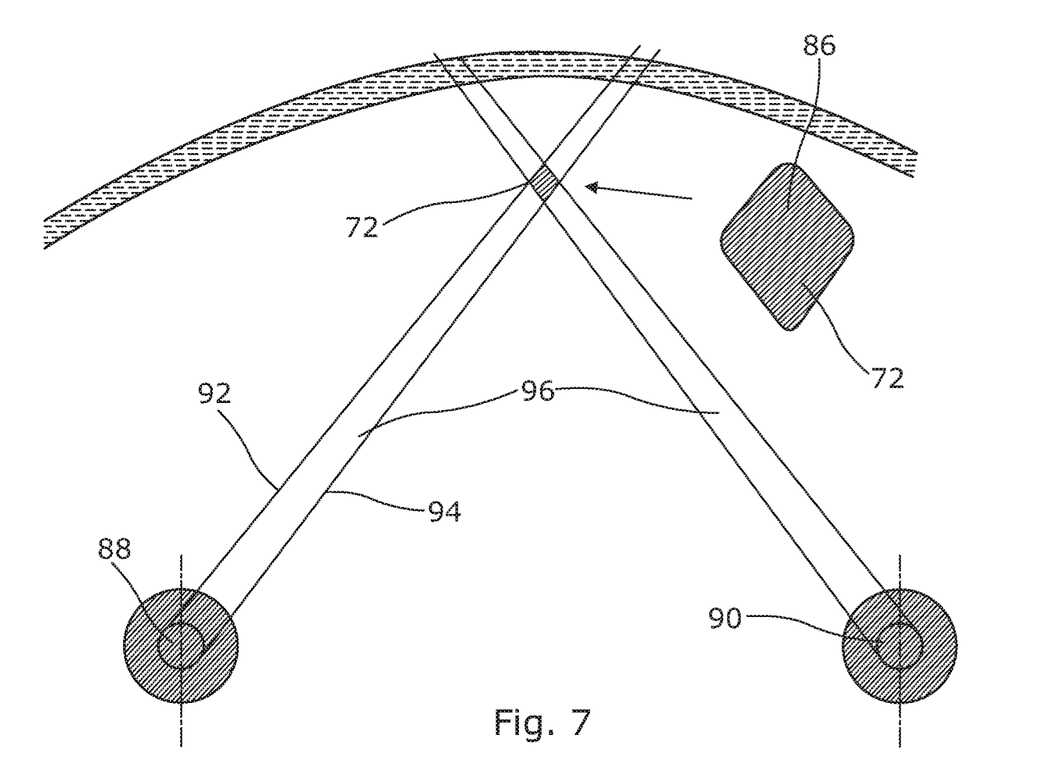
FIG. 7 shows a partial schematic view of the cockpit in section along a horizontal plane located in the area facing the pilot and co-pilot according to one embodiment of the rod according to the present invention.
Figure 8:
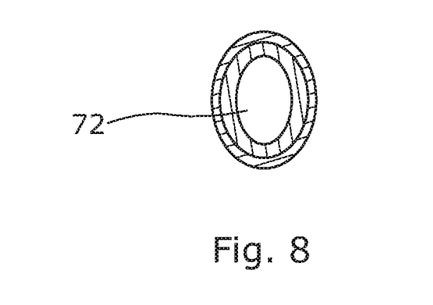
FIG. 8 shows a cross section of another embodiment of the rod.

The body 86 of the rod 72 has an optimized shape so that the binocular field of vision of the pilot and co-pilot to the outside can be the best possible. For example, the rod has a quadrangular section and in the embodiment represented in FIG. 7, a diamond shape. FIG. 8 shows another possible form of rod with an oval section. The rod in this configuration comprises two coaxial cylindrical parts fitted one inside the other. This profile makes it possible to achieve a double path for the flow of forces.

Figure 9A:
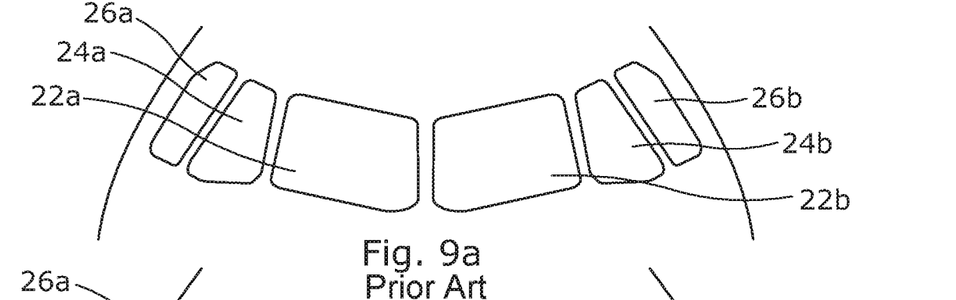
FIGS. 9a to 9e show a schematic front plan view of the windshield according to different embodiments of the present invention.

FIGS. 9a to 9e show that the present invention can be applied to panels other than the central panel. FIG. 9a includes the windshield of the prior art in order to make possible a comparison of each of the possible applications illustrated in FIGS. 9b to 9e.

Figure 9B:
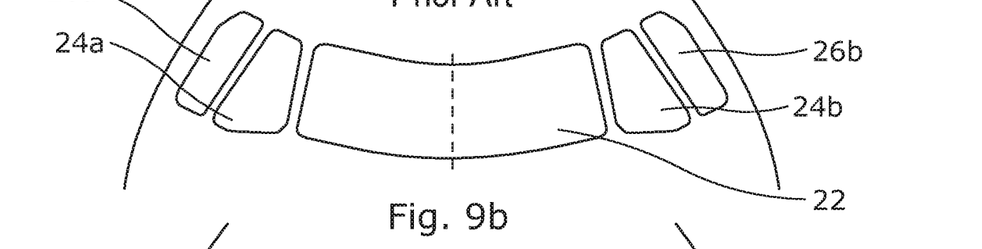

FIG. 9b shows the embodiment described above in which the front panels have been merged into a single front panel 22.

Figure 9C:
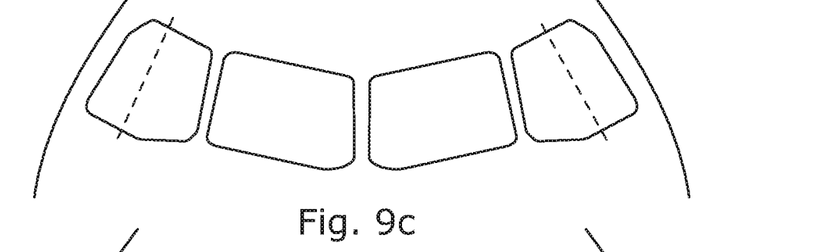

FIG. 9c shows that the present invention also applies to the side panels 24a, 24b and rear panels 26a, 26b. The side 24a and rear 26a panels are joined into a single panel. The same is true of the side 24b and rear 26b panels. The front panel remains a two-piece panel. A rod is introduced for each resulting "rear-side" panel. The rod is represented by a dotted line to show one possible position thereof in the illustrated embodiment. It is then the side and rear field of vision of the pilot and co-pilot which is improved.

Figures 9D, 9E:
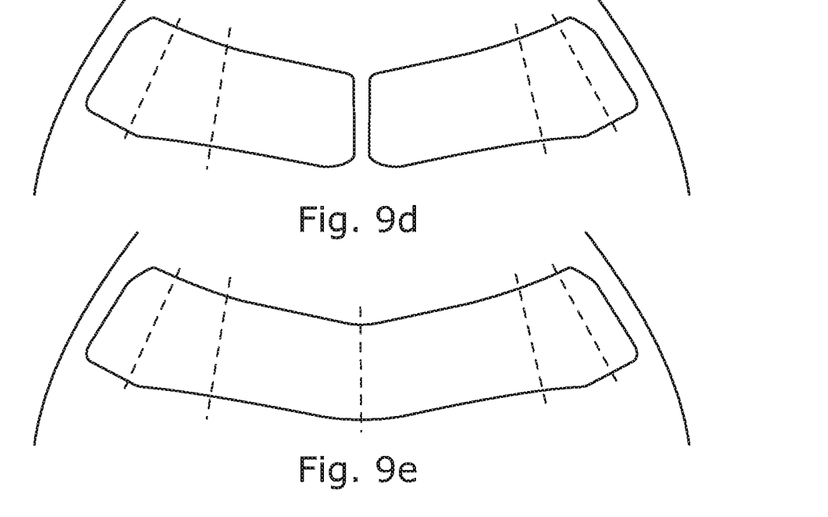

FIG. 9d shows a merging of the rear panel 26a with the side panel 24a, itself merged with the front panel 22a. The same is true of the rear panel 26b, the side panel 24b and the front panel 22b. In this case shown, the front panel remains in two pieces. It is then necessary to introduce four rods, two on each side. In the same way as for FIG. 9c, each rod is represented by a dotted line. The side and rear field of vision is then further improved as compared to the previous configuration illustrated in FIG. 9c.

FIG. 9e shows the merging of all the panels with each other to form a single windshield. Five rods are required. The previous four rods and the central rod of the embodiment as described in detail previously.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft windshield comprising a transparent panel held inside a structure of the aircraft, in which an upper part and a lower part are bridged by an elongated structural element, so that loads applied to said panel from the upper part and the lower part are at least partially diverted, the elongated structural element is positioned inwardly from the transparent panel towards a cockpit interior and in front of the transparent panel between opposing peripheral edges of the transparent panel such that the elongated structural element is within a field of vision of a pilot in the cockpit looking through the transparent panel, wherein the elongated structural element is independent of the panel, at a distance from the panel, and positioned transversely between the lateral parts of a structure framing the panel, at a distance from the lateral parts of the structure framing the panel.

2. The windshield according to claim 1, wherein the panel is continuous with regard to the structural element.

3. The windshield according to claim 1, wherein the panel has a curvature in at least one transverse direction.

4. The windshield according to claim 1, wherein the elongated structural element has a first end attached to the upper part of the aircraft structure and a second end attached to the lower part.

5. The windshield according to claim 4, wherein the structural element is a rod hinged about a pivot at each of its ends to a structure framing the panel.

6. The windshield according to claim 1, wherein a structure framing the panel is of greater thickness than the thickness of the panel so as to form a recess.

7. The windshield according to claim 1, wherein the elongated structural element is a central rod positioned in a vertical plane of symmetry of the aircraft.

8. The windshield according to claim 1, wherein the panel comprises a plurality of elongated structural elements.

9. The windshield according to claim 8, further comprising a single panel provided with a plurality of bridges.

10. The windshield according to claim 1, further comprising a plurality of panels bridged by a plurality of elongated structural elements.

11. An aircraft provided with a windshield according to claim 1.

12. An aircraft windshield comprising:
   a transparent panel held inside a structure of the aircraft, in which an upper part and a lower part are bridged by an elongated structural element, so that loads applied to said panel from the upper part and the lower part are at least partially diverted,
   wherein the elongated structural element has a first end attached to the upper part of the aircraft structure and a second end attached to the lower part,
   wherein the structural element is a rod hinged about a pivot at each of its ends to a structure framing the panel.

* * * * *